(12) United States Patent
Kamiya (10) Patent No.: US 6,642,755 B2
(45) Date of Patent: Nov. 4, 2003

(54) BUS DRIVER HAVING NOISE REMOVING CIRCUIT FORMED BY PULL-UP RESISTOR

(75) Inventor: Hiroshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/811,886

(22) Filed: Mar. 20, 2001

(65) Prior Publication Data

US 2001/0010472 A1 Aug. 2, 2001

Related U.S. Application Data

(62) Division of application No. 09/281,069, filed on Mar. 9, 1999, now abandoned.

(30) Foreign Application Priority Data

Mar. 9, 1998 (JP) .......................................... 1998-056663

(51) Int. Cl.[7] ................................................ H03B 1/00
(52) U.S. Cl. ........................ 327/108; 327/379; 327/389; 326/83; 326/86
(58) Field of Search ................................ 327/108, 379, 327/389, 427, 432–434, 112; 326/21, 26, 27, 30, 83, 86

(56) References Cited

U.S. PATENT DOCUMENTS

| | | | | |
|---|---|---|---|---|
| 4,918,026 A | * | 4/1990 | Kosiak et al. | 438/207 |
| 5,023,479 A | | 6/1991 | Jeffrey et al. | 326/109 |
| 5,066,876 A | | 11/1991 | Fukuda et al. | 327/544 |
| 5,218,247 A | * | 6/1993 | Ito et al. | 326/83 |
| 5,638,402 A | * | 6/1997 | Osaka et al. | 375/257 |
| 5,821,767 A | * | 10/1998 | Osaka et al. | 326/30 |
| 6,211,694 B1 | * | 4/2001 | Kamiya | 326/86 |
| 6,211,703 B1 | * | 4/2001 | Takekuma et al. | 326/30 |
| 6,265,912 B1 | * | 7/2001 | Kamiya | 327/108 |

FOREIGN PATENT DOCUMENTS

| | | |
|---|---|---|
| JP | 57-176437 | 10/1982 |
| JP | 57-203122 | 12/1982 |
| JP | 58-78221 | 5/1983 |
| JP | 58-142418 | 8/1983 |
| JP | 58-182737 | 10/1983 |
| JP | 60-128717 | 7/1985 |
| JP | 1-163812 | 6/1989 |
| JP | 1-304518 | 12/1989 |
| JP | 3-250813 | 11/1991 |
| JP | 4-618 | 1/1992 |
| JP | 6-35582 | 2/1994 |
| JP | 7-36583 | 2/1995 |
| JP | 7-334281 | 12/1995 |
| JP | 08251000 A | * 9/1996 |
| JP | 8-251000 | 9/1996 |
| JP | 8-286793 A | * 11/1996 |
| JP | 9-121148 | 5/1997 |

\* cited by examiner

*Primary Examiner*—Terry D. Cunningham
*Assistant Examiner*—Long Nguyen
(74) *Attorney, Agent, or Firm*—Sughrue Mion, PLLC (57) ABSTRACT

In a bus driver for driving a bus having first and second power supply terminals, an input terminal for receiving an input signal and an output terminal connected to the bus, a switching element is provided between the output terminal and the second power supply terminal, and the switching element is controlled by a voltage at the input terminal. A pull-up resistor is connected between the first power supply terminal and the output terminal.

7 Claims, 7 Drawing Sheets

BUS DRIVER HAVING NOISE REMOVING CIRCUIT FORMED BY PULL-UP RESISTOR

This is a Divisional Application of application Ser. No. 09/218,069 filed Mar. 9, 1999, now abandoned, the disclosure of which is incorporated herein by reference.

BACKGROUND OF THE INVENTION

1. Field of the Invention

The present invention relates to a bus driver for a data processing system.

2. Description of the Related Art

In a data processing system, a plurality of packages each including a semiconductor integrated circuit are inserted into a back panel. The packages share buses formed on the back panel. In this case, each of the packages has a bus driver and a bus receiver.

A prior art bus driver includes an open drain type metal oxide semiconductor (MOS, broadly, metal insulating semiconductor (MIS)). This will be explained later in detail.

However, the prior art bus driver per se does not include a noise removing circuit, so that a large ringing effect is generated in the bus. Therefore, it takes a long time to converge the ringing effect, which substantially increases the propagation delay time of signals from the bus driver to its respective bus receivers. Also, it is difficult to increase the frequency of the propagated signals.

SUMMARY OF THE INVENTION

It is an object of the present invention to reduce the ringing effect in a bus driver, thus substantially reducing the signal propagation delay time as well as increasing the frequency of the propagated signals.

According to the present invention, in a bus driver for driving a bus having first and second power supply terminals, an input terminal for receiving an input signal and an output terminal connected to the bus, a switching element is provided between the output terminal and the second power supply terminal, and the switching element is controlled by a voltage at the input terminal. A pull-up resistor is connected between the first power supply terminal and the output terminal.

BRIEF DESCRIPTION OF THE DRAWINGS

The present invention will be more clearly understood from the description as set forth below, as compared with the prior art, with reference to the accompanying drawings wherein.

DESCRIPTION OF THE PREFERRED EMBODIMENTS

Before the description of the preferred embodiments, a prior art bus driver will be explained with reference to FIGS. 1, 2, 3 and 4.

Figure 1:
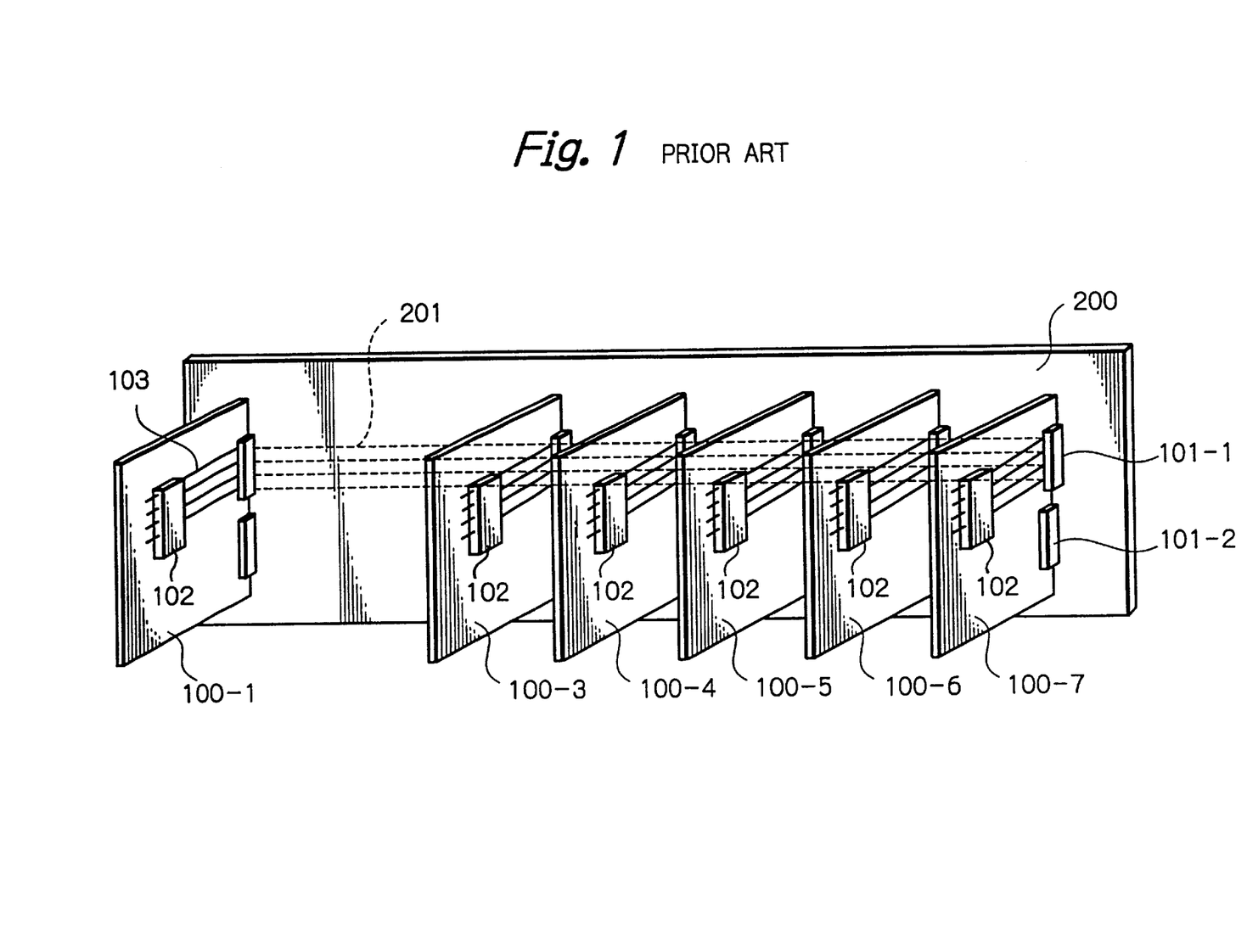
FIG. 1 is a block circuit diagram illustrating a prior art data processing system.

In FIG. 1, which illustrates a prior art data processing system, packages 100-1, 100-3, 100-4, . . . , 100-7 are inserted into a back panel 200 by connectors 101-1 and 101-2. In this case, a package 100-2 is not inserted into the back panel 200 intentionally. Thus, the packages 100-1, 100-3, 100-4, . . . , 100-7 share a bus 201 formed on the back panel 200.

One bus driver 102 is mounted on each of the packages 100-1, 100-3, 100-4, . . . , 100-7. The bus driver 102 is connected via a signal line 103 and the connector 101-1 to the bus 201. Also, one bus receiver (not shown) is mounted on each of the packages 100-1, 100-3, 100-4, . . . , 100-7. The bus receiver is connected via a signal line (not shown) and the connector 101-2 to the bus.

Figure 2:
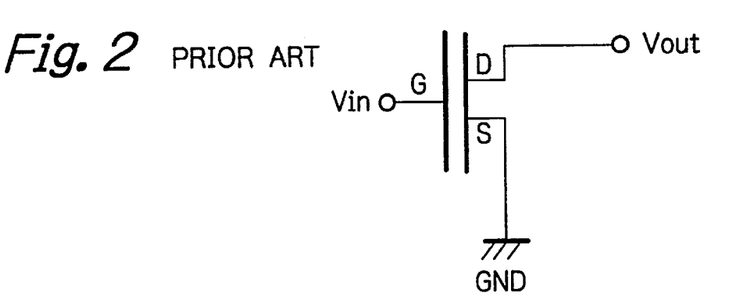
FIG. 2 is a circuit diagram of the bus driver of FIG. 1.

In FIG. 2, which is a circuit diagram of the bus driver 102 of FIG. 1, the bus driver 102 is formed by an open drain type MOS transistor having a gate for receiving an input voltage $V_{in}$, a grounded source and a drain for generating an output voltage $V_{out}$. That is, the bus driver of FIG. 2 does not have a noise removing circuit.

Figure 3:
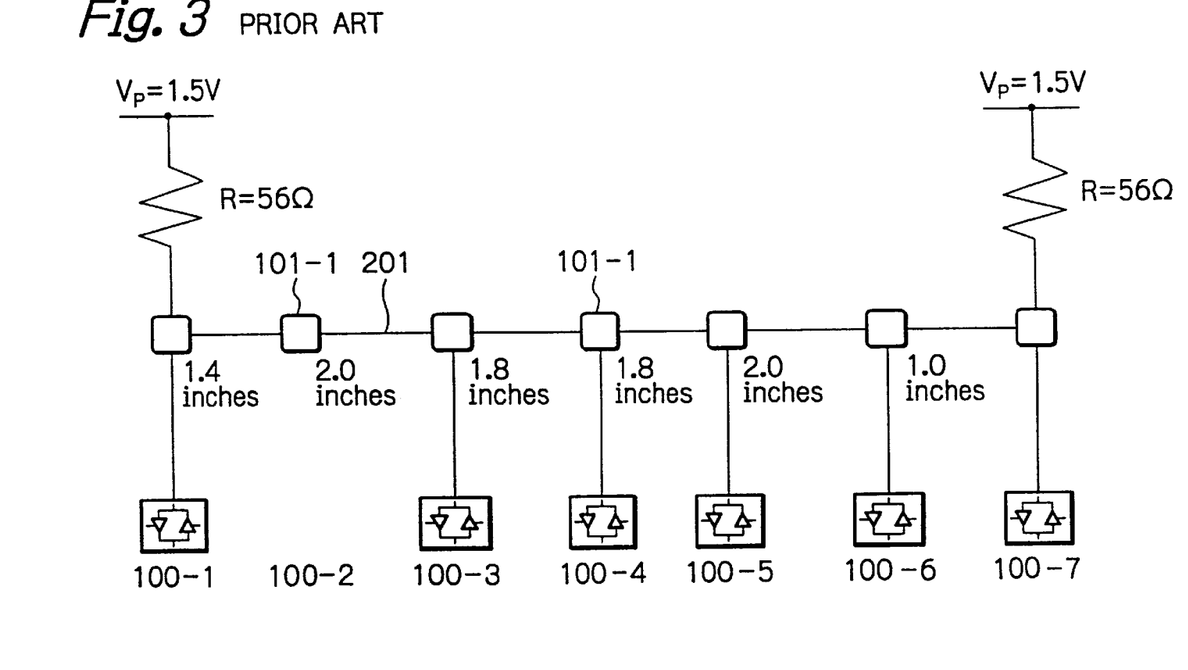
FIG. 3 is an equivalent circuit diagram of the data processing system of FIG. 1.

In FIG. 3, which is an equivalent circuit diagram of the system of FIG. 1, the spacing between the packages depends upon the height of heat sinks of semiconductor integrated devices mounted thereon. For example, the spacing between the packages 100-1 and 100-2 (in this case, package 100-2 is removed) is 1.4 inches; the spacing between the packages 100-2 and 100-3 is 2.0 inches; the spacing between the packages 100-3 and 100-4 is 1.8 inches; the spacing between the packages 100-4 and 100-5 is 1.8 inches; the spacing between packages 100-5 and 100-6 is 2.0 inches; and the spacing between the packages 100-6 and 100-7 is 1.0 inches. Also, the length of a stub of each of the packages, i.e., the distance between the connector 101-1 and each of the bus drivers is 1 inch. Further, a terminal resistor R formed on the back panel 200 is connected to the connector 101-1 of each of the packages 100-1 and 100-7.

Figure 4:
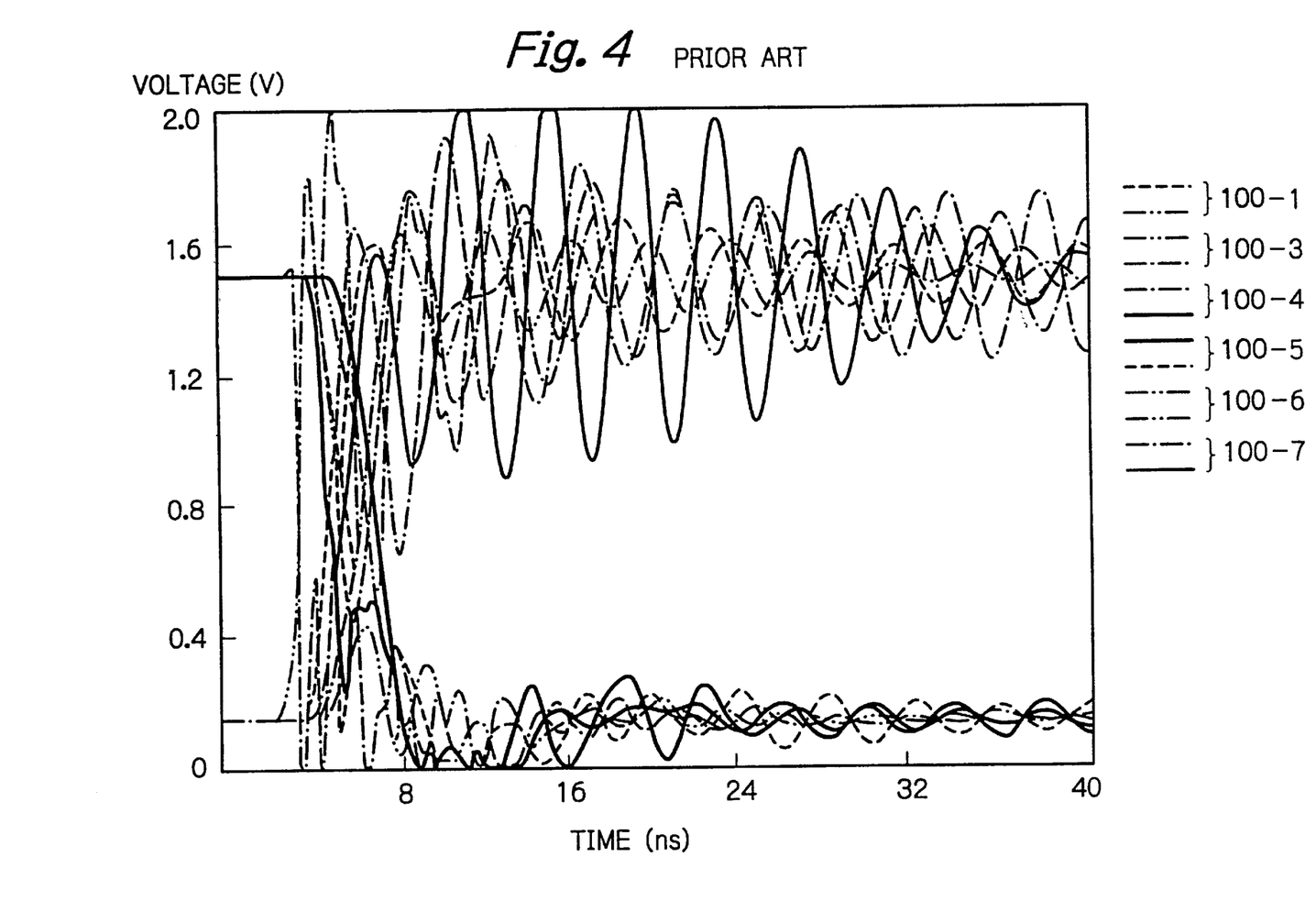
FIG. 4 is a timing diagram showing the received signals at the bus receivers of FIG. 1.

In FIG. 3, when the input voltage $V_{in}$ of the bus driver 102 included in the package 100-3 is switched from high to low and vice versa, the voltages at the bus receivers at the packages 100-1, 100-3, 100-4, . . . , 100-7 are obtained as shown in FIG. 4. As shown in FIG. 4, a large ringing effect is generated in each of the voltages of the bus receivers since the bus driver 102 does not have a noise removing circuit. That is, it takes longer than 40 ns to converge the voltages at the bus receivers. This substantially increases the signal propagation delay time, and also it is difficult to increase the frequency of the propagated signals.

Note that each bus receiver of the packages 100-1, 100-3, 100-4, 100-5, 100-6 and 100-7 had the same configuration as the bus driver of FIG. 2.

Figure 5:
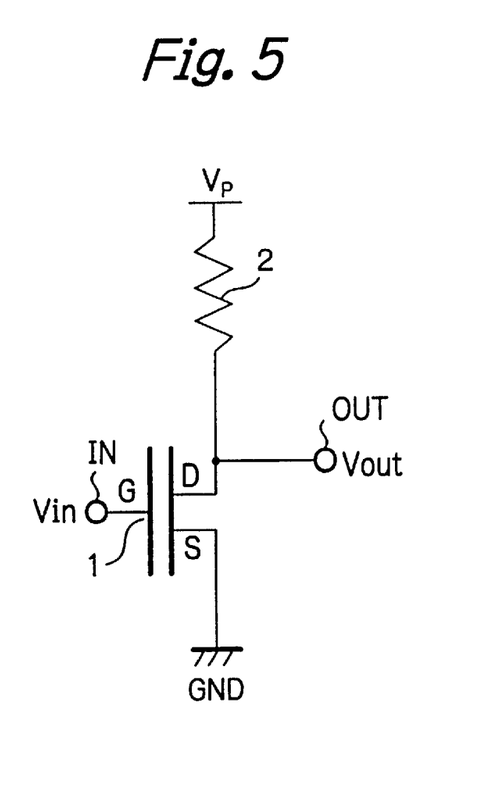
FIG. 5 is a circuit diagram illustrating a first embodiment of the bus driver according to the present invention.

In FIG. 5, which illustrates a first embodiment of the bus driver according to the present invention, the bus driver includes a MOS transistor 1 as a switching element having a gate connected to an input terminal IN for receiving an input voltage $V_{in}$, a drain connected to an output terminal OUT for generating an output voltage $V_{out}$, and a source connected to the ground terminal GND. Also, the bus driver includes a noise removing circuit formed by pull-up resistor 2.

Figure 6:
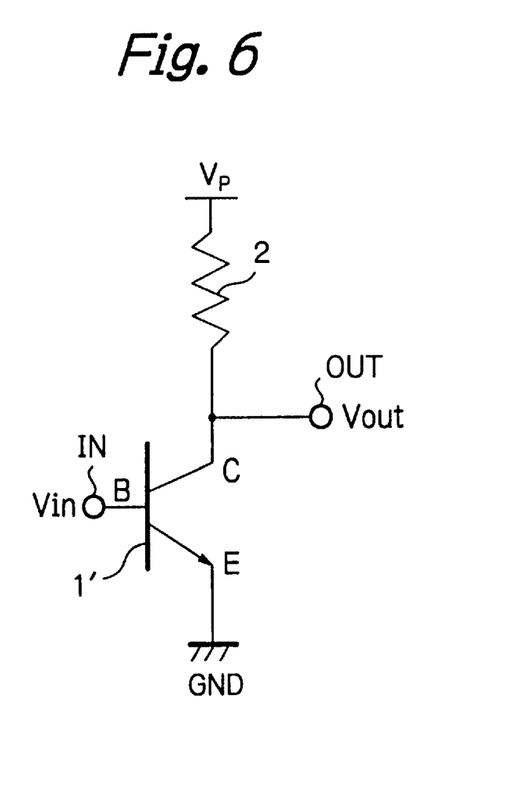
FIG. 6 is a circuit diagram illustrating a second embodiment of the bus driver according to the present invention.

In FIG. 6, which illustrates a second embodiment of the bus driver according to the present invention, the bus driver includes a bipolar transistor 1' instead of the MOS transistor 1 of FIG. 5. The bipolar transistor 1' has a base connected to the input terminal IN, collector connected to the output terminal OUT, and an emitter connected to the ground terminal GND. The bus driver of FIG. 6 operates in the same way as the driver of FIG. 5.

Figure 7:
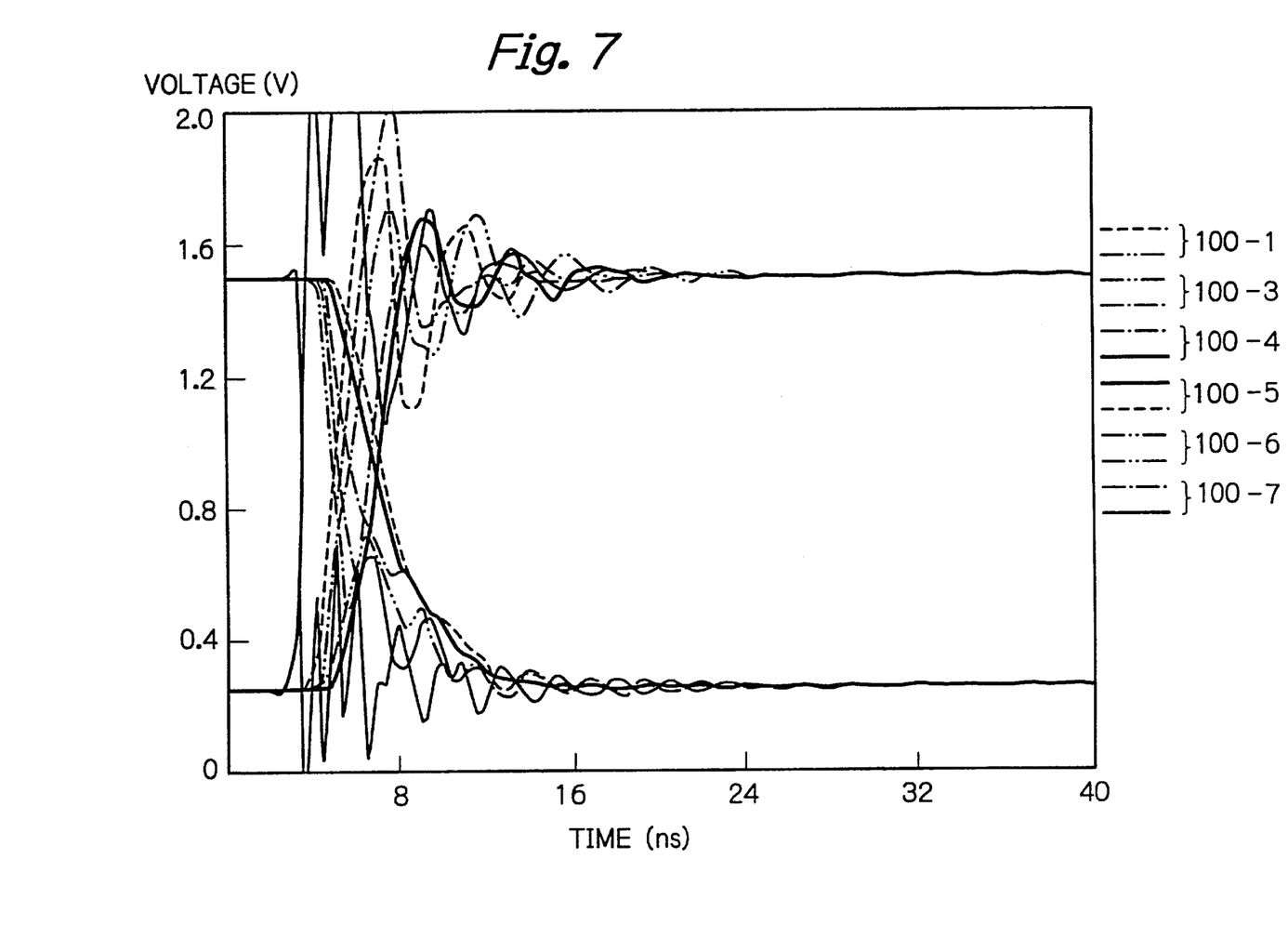
FIG. 7 is a timing diagram showing the effect of the first and second embodiment.

Assume that the bus driver of FIG. 5 or 6 is applied to the data processing system of FIGS. 1 and 3. In this case, when the input voltage $V_{in}$ of the bus driver of FIGS. 5 or 6 included in the package 100-3 is switched from high to low and vice versa, the voltages at the bus receivers at the packages 100-1, 100-3, 100-4, . . . , 100-7 are obtained as shown in FIG. 7. As shown in FIG. 7, the ringing effect generated in each of the voltages of the bus receivers is reduced, since the bus driver of FIGS. 5 or 6 has a noise removing circuit formed by the pull-up resistor 2. Therefore, it takes less than 20 ns to converge the voltages at the bus receivers. This substantially decreases the signal propagation delay time, and also, the frequency of the propagated signals can be increased.

Figure 8:
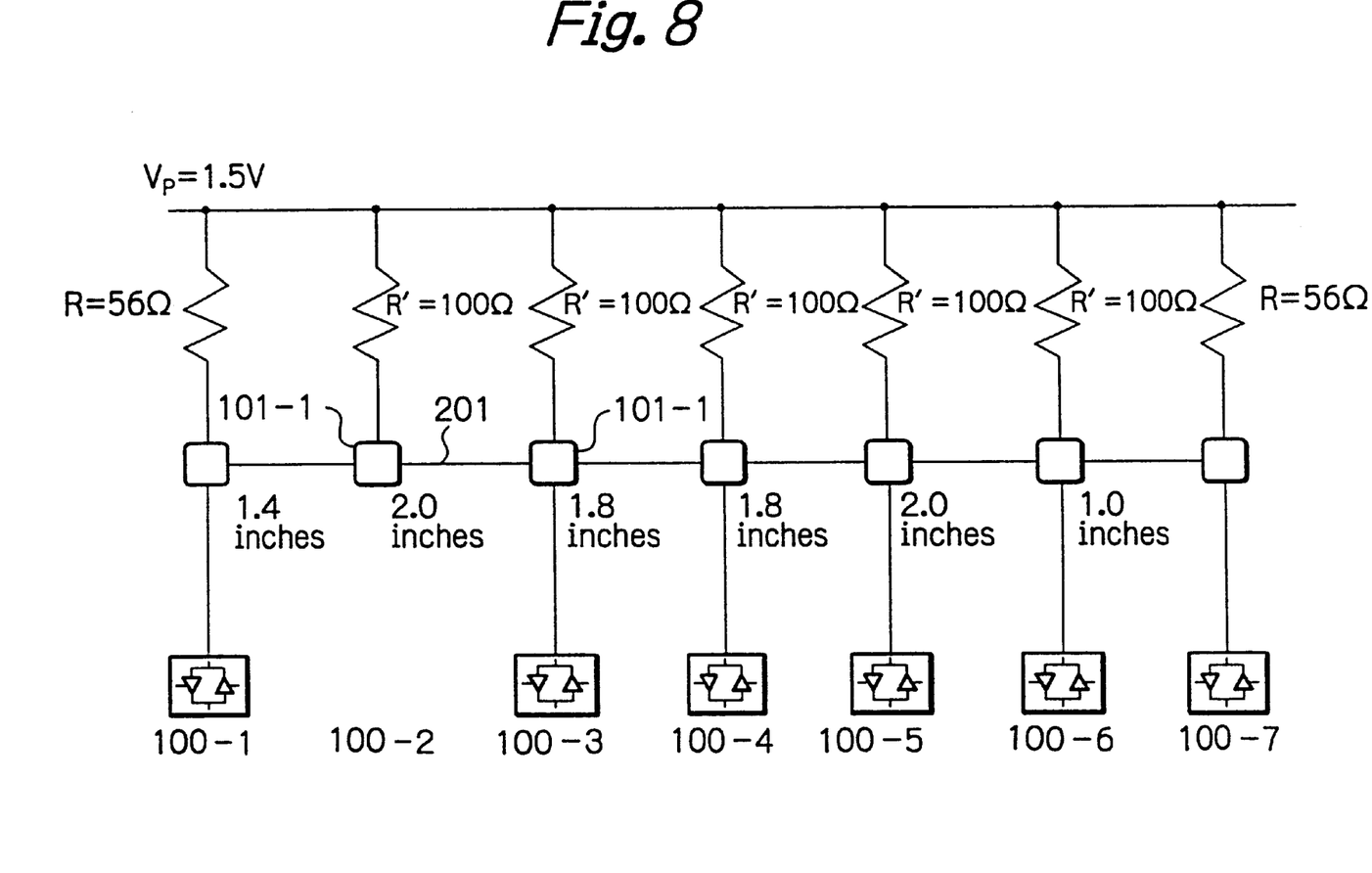
FIG. 8 is an equivalent circuit diagram illustrating a data processing system including a third embodiment of the bus driver according to the present invention.
Figure 9:
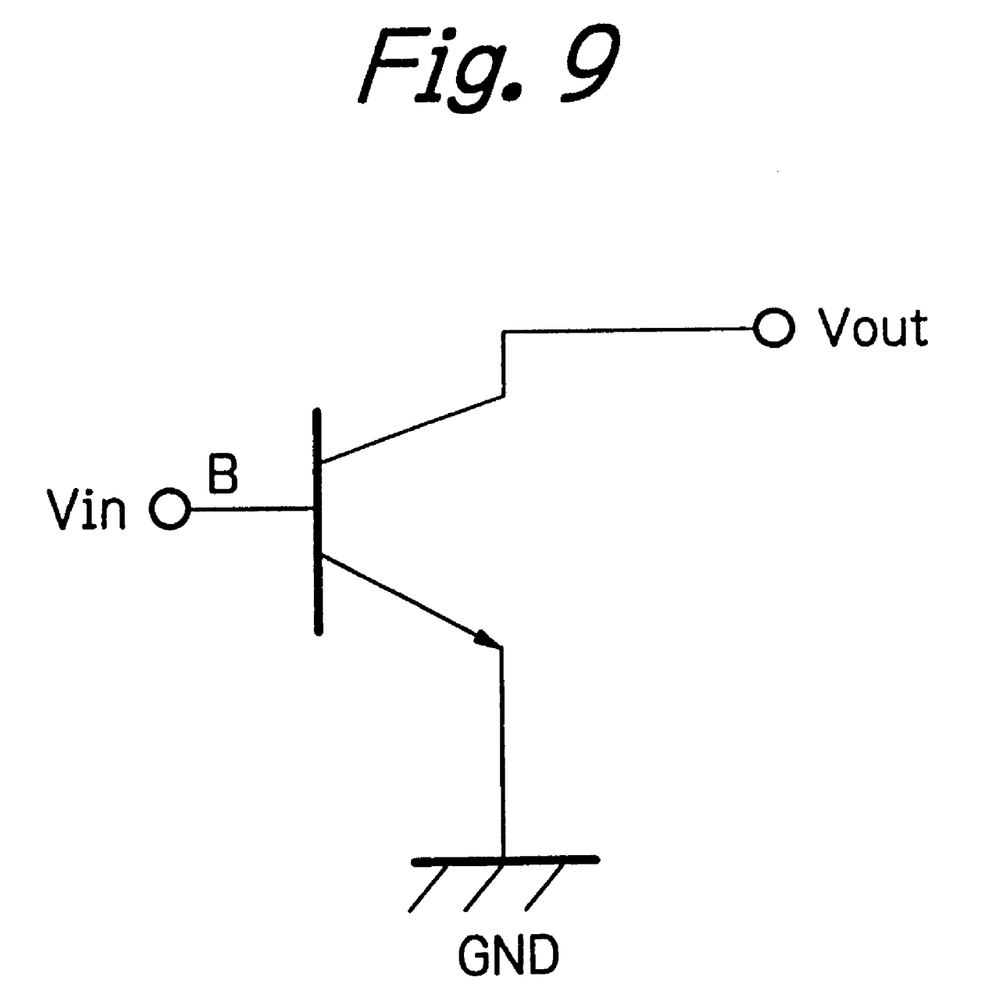
FIG. 9 is a circuit diagram of the bus driver of FIG. 8.

In FIG. 8, which illustrates a third embodiment of the present invention, one pull-up resistor R' formed on the back panel 200 is connected to the connector 101-1 of each of the packages 100-2, 100-3, 100-4, 100-5 and 100-6 of FIG. 3. Note that each of the packages 100-1, 100-3, 100-4, 100-5, 100-6 and 100-7 includes and open drain type MOS transistor as a bus driver or a bus receiver as illustrated in FIG. 2; however, this bus driver or bus receiver can be an open collector type bipolar transistor as illustrated in FIG. 9.

In FIG. 8, when the input voltage $V_{in}$ of the bus driver included in the package 100-3 is switched from high to low and vice versa, the voltages at the bus receiver at the packages 100-1, 100-3, 100-4, . . . , 100-7 are obtained in a similar way to that of FIG. 7. That is, the ringing effect generated in each of the voltages of the bus receivers is reduced, since the packages 100-2, 100-3, 100-4, 100-5 and 100-6 have a noise removing circuit formed by the pull-up resistor R'. Therefore, it takes less than 20 ns to converge the voltages at the bus receivers. This substantially decreases the signal propagation delay time, and also, the frequency of the propagated signals can be increased.

In the data processing system, of FIG. 8, each of the packages 100-1, 100-3, 100-4, 100-5, 100-6 and 100-7 includes an open drain type bus driver or an open collector type bus driver; however, the bus driver as illustrated in FIG. 5 or 6 can be used as such a bus driver.

As explained hereinabove, according to the present invention, the signal propagation delay time can be reduced, and also, it is easy to increase the frequency of the propagated signals.

What is claimed is:

1. A data processing system comprising:
    a back panel;
    a power supply line provided in said back panel;
    a plurality of packages each including a connector capable of being connected to said power supply line and a bus driver connected directly to said connector;
    a first terminal resistor connected between the connector of a first terminal of a one of said packages and said power supply line;
    a second terminal resistor connected between the connector of a second terminal of a second one of said packages and said power supply line; and
    a plurality of noise absorption resistors each connected between the connector of a one of said packages except for said one and said second one of said packages and said power supply line;
    wherein said first and second terminal resistors and said noise absorption resistors are provided on said back panel.

2. The system as set forth in claim 1, wherein said bus diver comprises an open drain type MIS transistor.

3. The system as set forth in claim 1, wherein said bus driver comprises an open collector type bipolar transistor.

4. The system as set forth in claim 1, wherein said bus driver comprises:
    first and second power supply terminals;
    an input terminal for receiving an input signal;
    an output terminal connected to said connector;
    a switching element, connected between said output terminal and said second power supply terminal, said switching element being controlled by a voltage at said input terminal; and
    a pull-up resistor, connected between said first power supply terminal and said output terminal.

5. The system set forth in claim 4, wherein said switching element comprises a MIS transistor.

6. The system as set forth in claim 4, wherein said switching element comprises a bipolar transistor.

7. The system as set forth in claim 1, wherein values of said noise absorption resistors are larger than values of said first and second terminal resistors.

* * * * *

UNITED STATES PATENT AND TRADEMARK OFFICE
CERTIFICATE OF CORRECTION

PATENT NO.     : 6,642,755 B2
DATED          : November 4, 2003
INVENTOR(S)    : Kamiya, Hiroshi It is certified that error appears in the above-identified patent and that said Letters Patent is hereby corrected as shown below:

Column 2,
Line 59, delete "2" insert -- 2-1 --

Signed and Sealed this

Thirteenth Day of April, 2004

JON W. DUDAS
*Acting Director of the United States Patent and Trademark Office*